Figure 1:
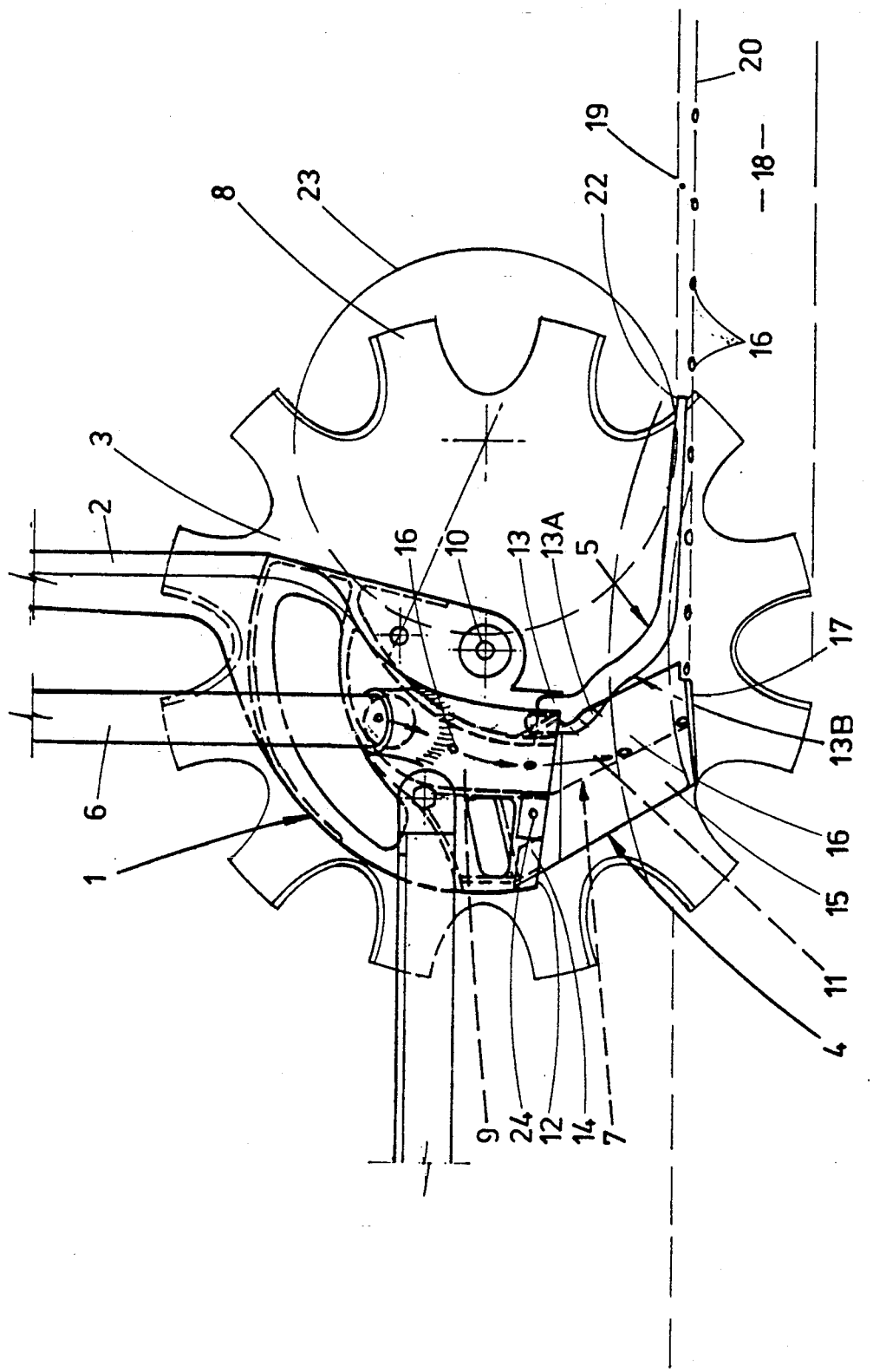

United States Patent [19]
Baker et al.

[11] Patent Number: 5,269,237
[45] Date of Patent: Dec. 14, 1993

[54] SEED SOWING APPARATUS

[75] Inventors: Christopher J. Baker, Taonui; Craig D. Kernohan, Palmerston; David J. Robinson, Rongotea, all of New Zealand

[73] Assignee: Massey University, Palmerston North, New Zealand

[21] Appl. No.: 844,442

[22] Filed: Mar. 2, 1992

[30] Foreign Application Priority Data

Mar. 1, 1991 [NZ] New Zealand ............ 237288

[51] Int. Cl.⁵ .............................. A01C 7/00
[52] U.S. Cl. ..................... 111/121; 172/566; 172/561; 111/157; 111/170; 111/73; 111/80
[58] Field of Search ............ 111/121, 124, 52, 59, 111/62, 136, 70, 71, 73, 79, 80, 81, 149, 168, 152, 157, 163, 167, 76, 169, 170, 186, 187; 172/558, 561, 566, 610

[56] References Cited

U.S. PATENT DOCUMENTS

| | | | |
|---|---|---|---|
| 573,416 | 12/1896 | King | 111/167 |
| 610,316 | 9/1898 | Arnett | 111/167 |
| 1,021,042 | 3/1912 | Heylman | 111/157 R |
| 1,124,695 | 1/1915 | Campbell | 111/157 |
| 1,873,128 | 8/1932 | Johnson | 111/163 X |
| 2,917,012 | 12/1959 | Oehler et al. | 111/157 |
| 4,275,671 | 6/1981 | Baker | 222/195 |
| 4,998,488 | 3/1991 | Hansson | 111/187 |

Primary Examiner—Randolph A. Reese
Assistant Examiner—Spencer Warnick
Attorney, Agent, or Firm—Abelman Fryne & Schwab

[57] ABSTRACT

Apparatus for laying seeds includes a towable frame from which one or more blades are supported for cutting a slot in the ground surface below, a seed and fertiliser chute feeds seed into the cut ground surface via a channel formed between the frame and blade(s) and tines which make a horizontal branch cut from the slot. A scraper device continually cleans the blade(s).

5 Claims, 6 Drawing Sheets

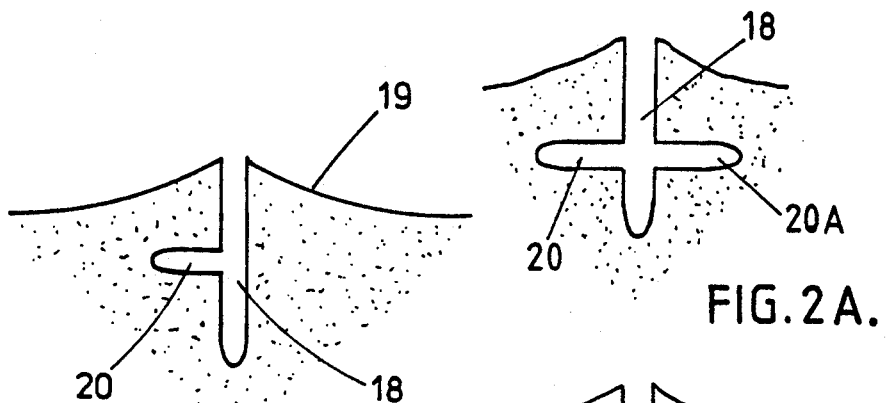
FIG. 2.
FIG. 2A.
FIG. 2B.
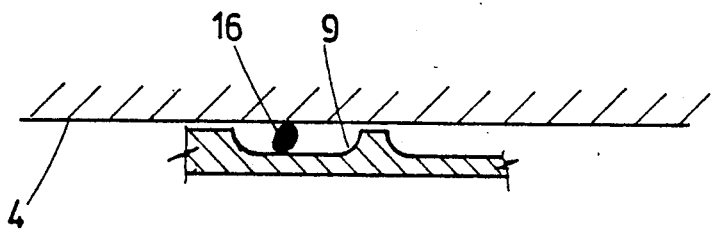
FIG. 3.
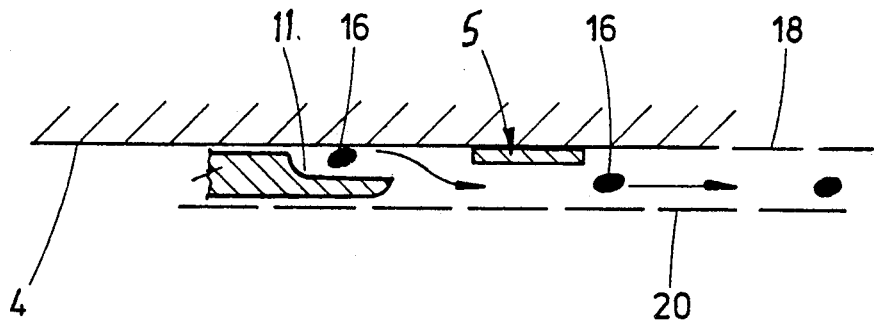
FIG. 3a.

SEED SOWING APPARATUS

This invention relates to seed sowing apparatus.

U.S. Pat. No. 4,275,671 described a seed sowing apparatus which includes a cutting disc, ground working tines and a seed and/or fertiliser dispersal means. The apparatus cuts a inverted T or L-shaped slot in the ground, seed and/or fertiliser is dispersed into the slot via the dispersal means and the ground surface is subsequently closed by wheels which trail the cutting disc and tines. The apparatus described in U.S. Pat. No. 4,275,671 has been used with a great deal of success, however our trials with the apparatus have indicated that the efficiency of such apparatus would be enhanced with a number of improvements.

It is an object of the present invention to provide improvements to seed sowing apparatus of the type described by U.S. Pat. No. 4,275,671.

Further objects and advantages of the present invention will become apparent from the ensuing description which is given by way of example.

According to the present invention, the seed sowing apparatus comprises a frame, a cutting blade mounted on a horizontal axis and rotatable with respect to the frame, means for attaching the frame with respect to a supporting carriage or towing vehicle which allows contact to occur between the cutting blade and a ground surface below the cutting blade having a peripheral ground entry part which is arranged to penetrate and cut a vertical slot in the ground surface as the apparatus travels over same, a chute incorporated into or supported by the frame, the chute being arranged to disperse seed and fertilizer into the vertical slot cut by the cutting blade, the frame supporting at least one tine having a tip part for location below ground level and extending rearwardly of leading cutting edges of the cutting blade, at least one tine being adapted to cut a substantially horizontal branch slot below ground level which extends from the vertical slot cut by the cutting blade, the tine being mounted with respect to the body on an axis below the axis of rotation of the cutting blade, the mounting allowing for lateral deflection of the tine in sympathy with flexing of the cutting blade.

The frame can support at least one tine having a tip part for location below ground level and extending rearwardly of leading cutting edges of said cutter blade said tine being adapted to cut a substantially horizontal branch slot extending from the vertical slot out by said cutter blade.

The apparatus can have a pair of scraper arms and tines situated on opposite sides of the cutter blade the combination of the cutter blade and tines being capable of cutting a substantially tee-shaped slot in the ground surface below the apparatus.

The chute means can be incorporated and embodied in a channel formed between the frame, the said at least one tine and the cutter blade said channel directing matter passing through it is a rearward direction and congruent with the direction of rotation of the cutting blade.

A lower part of the channel can be embodied in the said at least on tine which is convergent and tapers rearwardly to ensure that seed fed into the channel is forced into frictional contact with the cutter blade prior to dispersal from the channel.

The leading edge of scraping arm can present an obstacle to and diverts emerging seed sideways into the branch slot cut by the said at least one tine.

The said at least one tine and scraper can be co-axially mounted with respect to the body on a rearwardly and downwardly inclined axis below the axis of rotation of the cutter blade, the mounting of the said at least one tine and scraper allowing for minimal lateral deflection of the tine and scraper in sympathy with any flexing of the cutter blade which may occur.

The apparatus may include a press wheel supported by said frame and trailing the cutter blade said press wheel being adapted to close the vertical slot cut by the cutter blade.

Figure 1A:
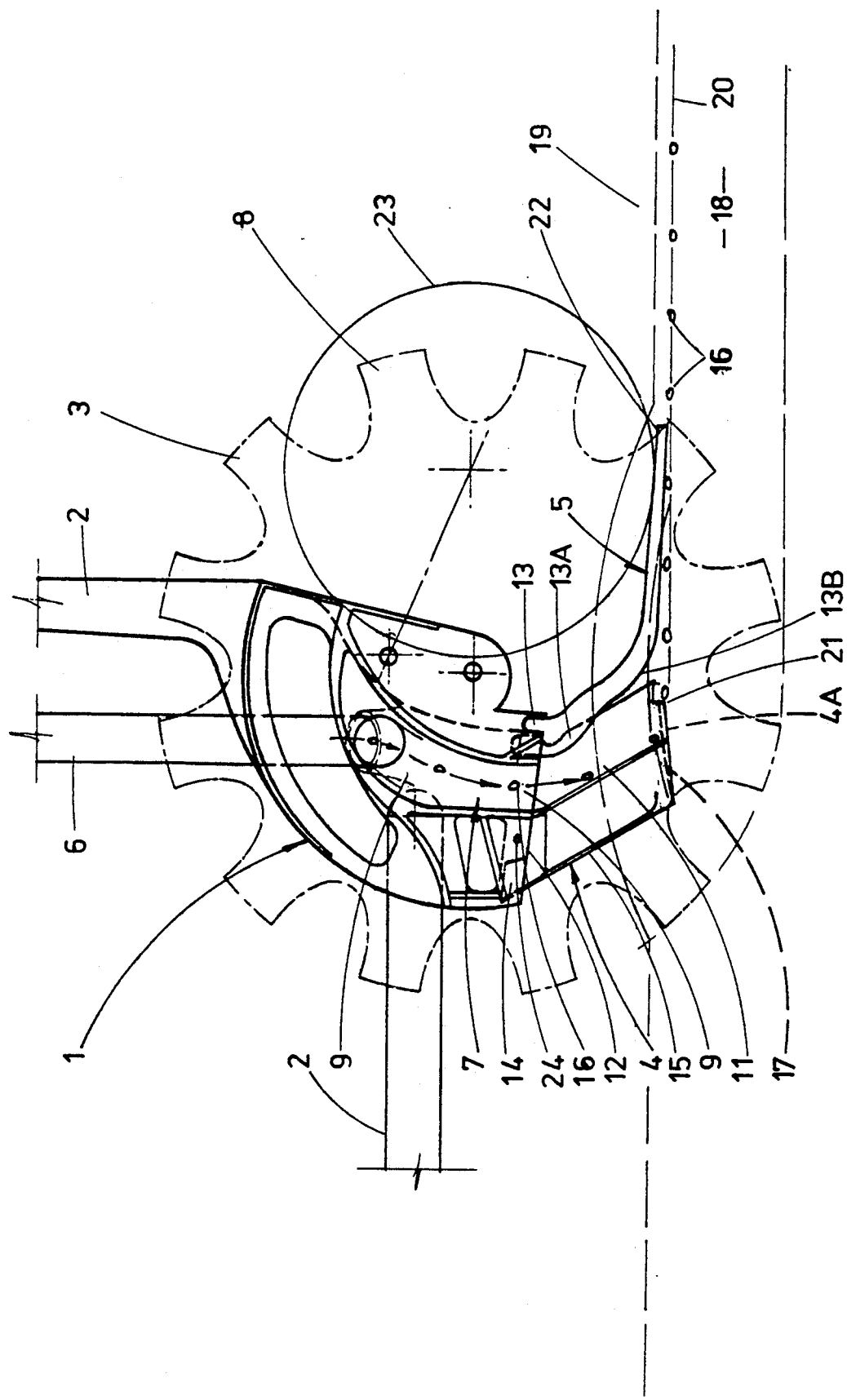
Figure 4:
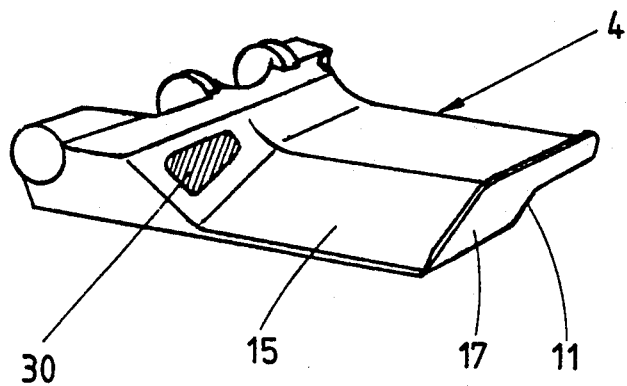
Figure 5:
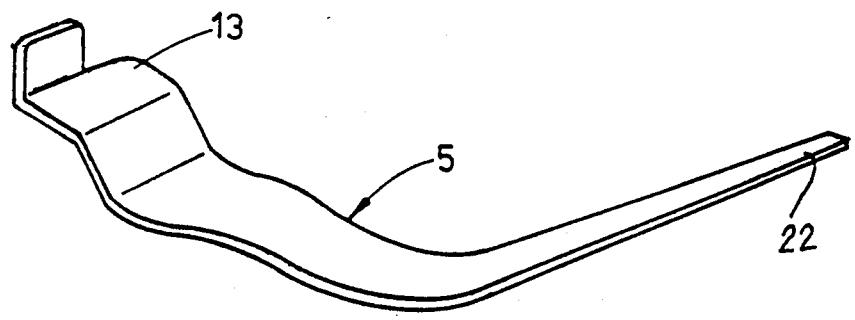
Figure 6:
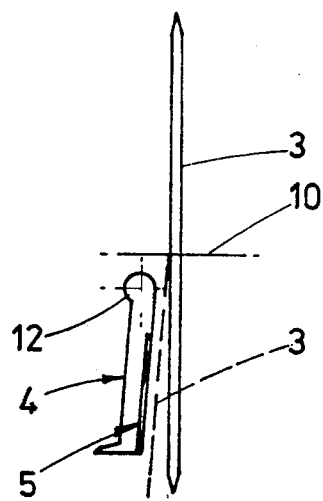
Figure 7:
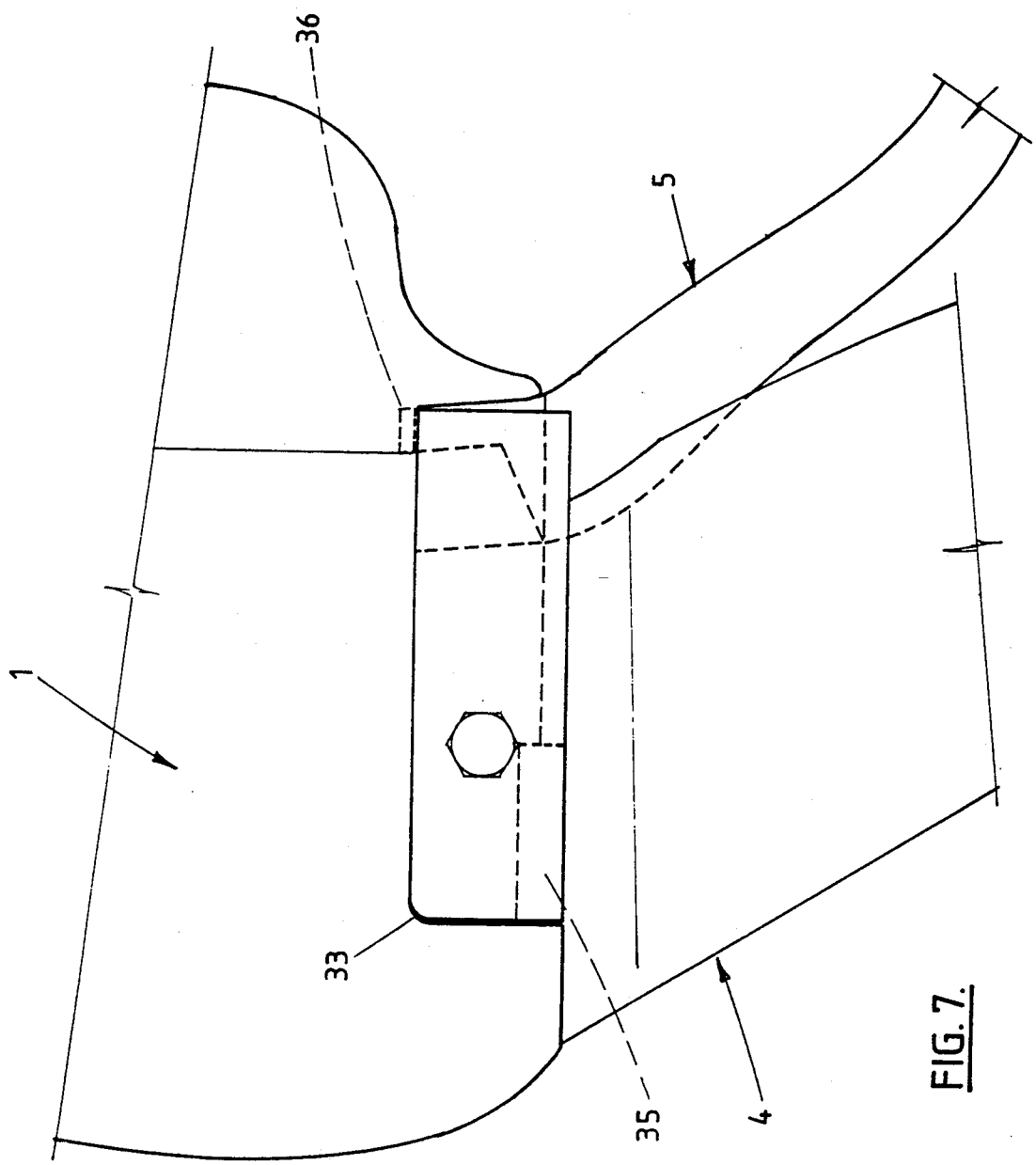
Figure 8:
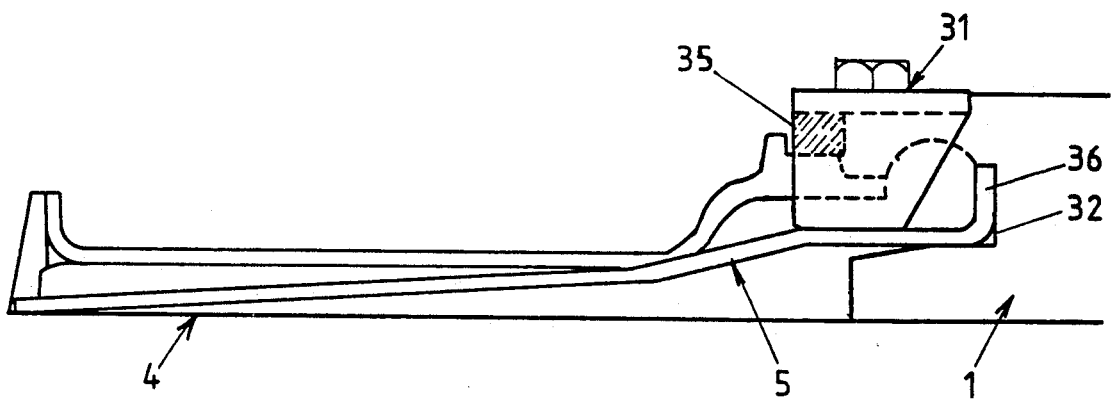
Figure 9:
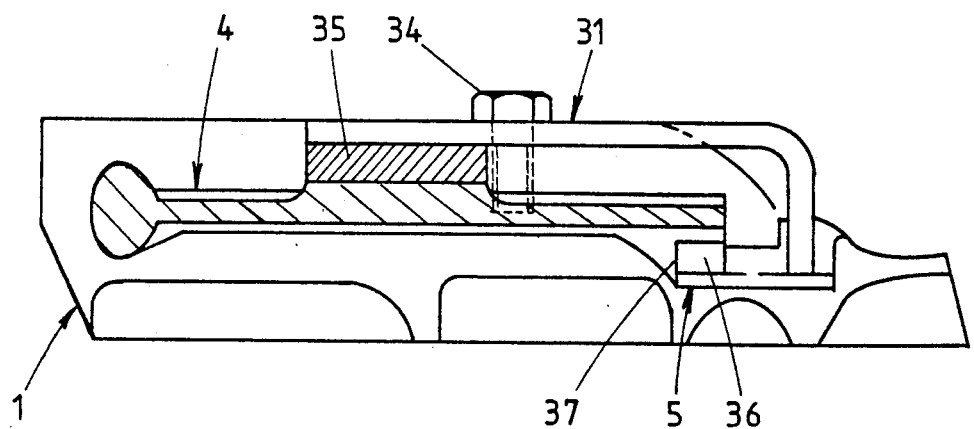

Aspects of the present invention will now be described with reference to the accompanying drawings in which:

FIG. 1 is a side view of one possible form of the apparatus in accordance with the present invention, and FIG. 1A is a side view of the apparatus from the other side with the cutting disc thereof shown in broken outline, and FIG. 2 is an end view of the slot cut in the ground by the apparatus of FIG. 1 when it is in use, and FIGS. 2A and 2B are end views of slots cut in the ground by modified apparatus in accordance with the present invention, and FIGS. 3 and 3A of the drawings are diagrammatic sectional drawings showing how seed is dispersed from the apparatus, and FIG. 4 is a side perspective view of a time for the apparatus of FIG. 1, and FIG. 5 is a side perspective view of a scraper for the apparatus of FIG. 1, and FIG. 6 is a diagrammatic end view of the disc, scraper and tine of the apparatus of FIG. 1 showing flexure of the disc, and FIG. 7 is a side view of a portion of the apparatus where the tine and scraper are hinged, and FIG. 8 is a rear view of the tine and scraper assembly, and FIG. 9 is a partial sectional view of the tine and scraper from below.

The seed sowing apparatus illustrated by way of example comprises a frame generally indicated by arrow 1 from which extends mounting arms 2 connectable to a towing vehicle or subframe (not shown).

The body 1 can be fabricated or moulded and supports a cutting blade 3, at least one tine generally indicated by arrow 4, a scraper generally indicated by arrow 5, and a seed and/or fertiliser chute 6 which directs fertiliser and/or seed or other matter into a channel generally indicated by arrow 7. The channel 7 is defined by adjacent surfaces of the disc 3 and grooves 9, 11 in the body 1 and tine 4. The disc may be provided with a number of teeth 8 and the apparatus generally operates similarly to that described in U.S. Pat. No. 4,275,671.

The body, chute, tine and scraper can be duplicated in opposite hand on both sides of the cutting disc and any number of such assemblies may be provided with respect to a supporting subframe (not shown) in an aligned or staggered formation.

In use the channel 7 directs seed and/or other materials into a slot cut by the blade 3 and tines 4. Material entering the chute 6 passes through groove 9 and then groove 11 and then into the slot cut by the disc and tine.

In the example illustrated the tines 4 are hinged at the base 12 of the body 1 which also supports fixed end 13 of the scraper 5. An open slot 14 at the base 12 of the body can be used to co-axially secure complimentary upper edges of the tine 4 and the fixed end 13 of the scraper 5 on a rearwardly and downwardly inclined axis. The slots 14 are somewhat larger than necessary and allow the tine 4 limited lateral deflection in sympathy with any flexing of the blade 3. A portion 13A of the scraper 5 is tucked behind the tine and its movement is constrained.

The outer surface of each tine is characterised by a sloping and tapered leading edge 15.

In the example illustrated the tine 4 is provided with a laterally projecting wing 17 similar to that described in New Zealand Patent No. 184742. The blade 3 makes a vertical cut 18 in the ground surface 19 and the wing 17 makes a supplementary side cut 20 just below the ground surface 19. Seeds 16 are deposited in the cut 20 at regular intervals. "Twin-tine" apparatus may be arranged to make sideways cuts 20A and 20B as illustrated by FIGS. 2A and 2B of the drawings. Fertilizer is deposited in the opposite cuts 20A and 20B.

Use of the inner surfaces of the body and tine 4 to define one wall of the dispersal channel and a moving disc has the advantage that any slot cut by the apparatus is very narrow, minimising ground disturbance.

The blade 3 is normally made of stiff but flexible material. Natural soil forces, hillsides and turning corners cause the soil-engaging portion of the disc to flex slightly (see FIG. 6) from side to side during use. The tine 4 is able to pivot so that is will allow flexure of the disc, whether it be away from the normal position of the tine or towards it. Soil reaction forces from the soil being deflected sideways keep the leading edge 15 of the tine 4 in intimate contact with the blade regardless of flexure of the latter. A small pre-load is also imposed on the tine from a spring device 24 which presses on the tine below the line of its pivot axis.

The scraping device 5 is attached in such a manner that upward movement caused by friction from the rotating disc is resisted but it is able to pivot sideways in the same way as the tine. The scraping device 5 is kept in intimate contact with the disc by the soil forces acting towards the blade. These soil forces which might otherwise be neutral or even act away from the blade in this zone, are caused to act towards the disc by the forces of press wheels, 23, which are pressed onto the ground and are angled towards the blade at their bases.

When the blade 3 flexes towards the scraping device (FIG. 6) it naturally maintains contact with the scraping device since in this case the blade pushes the scraping device with it. When the blade flexes away from the scraping device the latter is forced to follow the blade because the rear edge of the tine 4 overlaps a portion of the scraping device 5 at 13A. The forces causing the tine to follow the blade as it flexes away from it are greater than the forces generated through the soil onto the scraping device by the wheels 23. In the embodiment illustrated the tine is therefore used to ensure correct following of the flexure of the blade by the scraping device. As an alternative the scraping device may be individually pre-loaded.

Although the scraping device is primarily to scrape soil from the blade 3 as the latter withdraws from the seed zone as it rolls forward, a vertical portion 13B of the scraping device also provides a partial barrier in the rear gap between the tine and the blade. On occasions, large seeds pick up frictional velocity from the contact with the revolving blade as they pass down through the channel 7. This causes a small proportion of large seeds to change direction from a substantially vertical path and instead deflect rearwards in the direction of rotation of the blade. The partial barrier at the rear of the tine, provided by the vertical portion of the scraping device, resists exit of such seeds from the tine area altogether.

In order for the tine 4 to maintain its position relative to the blade 3 and to remain in intimate contact with the blade throughout the entire frontal length of the tine it is positioned in a particular relationship to the blade. It is necessary to provide a means of shielding the upper open area of the tine from the ingress of soil swept around by the blade. The upper area of the tine forms a channel with the blade and this gap becomes the seed channel referred to earlier.

The frame 1 of the device is shaped so as to provide a series of close fitting surfaces alongside the blade so that soil which drops from the upper peripheries of the blade is deflected by these surfaces so as to fall harmlessly to the ground and not instead be permitted to work its way into the upper area of the tine from whence it would travel into the seed channel thereby blocking it in due course. The tine 4 can be provided with an aperture 30 which provides an escape between the blade 3 and inner surfaces thereof for trapped solids.

Two aspects of the design are important in this regard. The first is that the main soil-engaging area of the blade is caused to rotate externally to the protective surfaces of the body so that the frame 1 can intercept any soil which falls off the blade.

The second is that the tolerance between the protective surfaces of the frame 1 and the sides of the blade 3 remain close. This occurs even although the blade naturally flexes from side to side below its axle in the soil and thus by reaction through the resilient blade, also attempts to flex from side to side above its axle in the vicinity of the close-tolerance protective surfaces on the frame. If allowed to flex unrestrained in this manner the blade naturally presses against the frame above the ground. This would result in wear to the frame with consequent widening of the closely-set tolerances which in turn would permit ingress of soil that would eventually block the seed flow. Flexure of the blade in this region is prevented by either small support wheels (not shown) which are positioned on rigid axles attached to the frame so as to revolve on contact with both surfaces of the disc near its top and front, or by sacrificial wear-resistance blocks located so as to rub on the disc in the same regions. Two pairs of wear blocks may be provided, one pair at the lower front (about position 12 FIG. 1A) and the other pair an upper rearward position (not shown). The lower front blocks can be part of the tines themselves and are therefore automatically replaced when the new tines are fitted. The upper wear blocks can be separate wedge-shaped pieces that are tapped into T-shaped grooves in the main body 1. In order to ensure that they are replaced when the tines are replaced they form part of the tine casting and are located on the tines in such a position that they require to be knocked off with a hammer in order for the new tines to be fitted to the opener. Once knocked off the tines, these pieces can then be fitted in place of the worn blocks in the upper rearward position.

It is to be appreciated that a dispersal channel such as described may be used with seed sowing devices other than that described herein. In a simplified form of apparatus (not shown) where a lateral slot is not a requirement and no time is used the channel may be formed between an extending frame part and the cutting disc.

As discussed the channel 7 is in two parts and is defined by a U-shaped groove 9 formed in frame 1 and the blade 3, and a stepped face 11 of in the inner surface of the time 4. Whilst seed in groove 9 may be relatively unimpeded when the seed reaches groove 11 it is urged into frictional contact with the tapered face of tine 4 so as to allow large seeds to travel down a channel otherwise sufficiently narrow to encourage blockage during passage of the seeds. Seed 16 is urged into contact with the blade 3 by the angle the blade is to the vertical at the point (approximately 55°) which encourages vertically dropping seed as it exits groove 9 to fall towards the front wall of the groove 11. As the seed slides down the angled wall of groove 11 it comes into contact with the moving blade which agitates it helping it to fall within the narrow passage.

The scraping device 5 continuously cleans the surfaces of the blade so that soil and other extraneous matter does not adversely affect the operation of the apparatus.

The scraper 5 has a curved leading edge which extends downwardly and rearwardly and when the apparatus is in use lower portions of the scraper clean the outer peripheral edges of the blade which are below ground. The rearward facing edge of he scraper may also be curved although this is not essentially the case. In the embodiment illustrated portion 13A of the scraper is positioned between the tine 4 and the blade, but in contact with the innermost surface of the tine.

It will be observed that the trailing face end 22 of the scraper 5 extends almost on a horizontal plane parallel with the cut 20 out towards the extreme peripheral edge of the blade 3 under the ground surface 19 and in its position presents an obstacle to and will keep seed away from the vertical slot 18 cut by the blade. Press wheel 23 for compacting the ground after sowing may form part of the apparatus. Whilst the primary function of the wheel 23 is to close the soil slot, they also control depth and can be adjustable relative to the main body 1 in order to achieve this. The wheel 23 can be spoked in order to allow soil brought into and spilled onto the surface of the ground by the disc as it exits the ground to be ejected sideways through the wheels instead of being collected between wheels.

The soil slot created by the device is in the shape of an inverted T (FIG. 2A), modified T (FIG. 2B) or L (FIG. 2). A horizontal shelf created on one or both sides of the slot supports the placement of seeds and/or fertilizer and/or other particulate or liquid materials in such a manner that the material placed on the soil shelf on one side of the slot is physically separated from material placed on the soil shelf on the other side of the slot. The physical dimension of such separation is at least equal to the thickness of the blade which separates the two at the time of placement, but is usually increased by an amount of soil disruption that occurs on either side of the blade as it withdraws from the soil. Skin friction on the blade causes a degree of adherence of soil to the blade so that seeds and other materials placed on their respective soil shelves are caused to be moved further away from the centre line of the slot as the blade withdraws, than the positions they took upon first being released from the device. The scraping device 5 has the function of controlling the amount of disruption caused by skin friction between the blade and the soil since such skin friction varies greatly with soil type, collodial clay content and moisture content.

Separation of the seed from other material is important in order to prevent damage occurring to seeds as a result of their otherwise coming to rest in close proximity to chemical fertilizers. The separation is also assisted by the blade penetrating the soil several centimeters below either of the respective soil shelves so as to leave a deep vertical slit which disrupts possible movement of chemical solutes from dissolving fertilizers through the soil towards the seed.

The soil shelves do not need to be at identical heights relative to the ground surface. On occasions is may be desirable to locate one shelf slightly lower than the other by employing a longer tine on one side, although the blade is always expected to penetrate the soil to a greater depth than the lower-most shelf. (See FIG. 2B).

It is also not necessary to have two shelves. By using only one tine on one side of the blade an L shaped slot results which is biologically desirable for seed in the same way as if an inverted T shaped slot is used with two shelves to separate seed and fertilizer or other material. In an L shaped slot it is not usual to apply both seed and fertilizer at the same time because of the potential damage to seeds from contact with fertilizer although other materials not injurious to seeds (e.g. bacterial innoculant or certain pesticides) might be applied mixed with the seed on the single soil shelf of an L shaped soil slot.

FIGS. 7, 8 and 9 of the drawings illustrate in several aspects the attachment of the tine 4 and scrapper 5 to the frame 1. Attachment of the tine 4 and scraper 5 is facilitated by an L section attachment plate generally indicated by arrow 31, a groove 32 in the frame 1 and an appropriately shaped recess 33 in the frame 1. The L section attachment plate 31 is fixed to the frame 1 by a bolt 34 and a resilient pad 35 in a manner which will enable the tine 4 and scraper 5 to deflect in sympathy with any deflection of the adjacent cutting blade. A tail 36 is located in a complimentary recess 37 in the tail of the tine 4. To remove the scraper 5 the bolt 34 is partially unscrewed to release pressure on the pad 35 so that the tine 4 can be slipped forward to uncover the tail 36 and the scraper removed in a downward direction. The inner end of bolt 34 can be accommodated in an enlarged recess in the tine 4 to provide security against the tine for working its way forward during operation of the apparatus.

Elements of the apparatus can be moulded or fabricated from suitable materials such as metals and plastics.

We claim:

1. Seed sowing apparatus comprising a frame, a cutting blade mounted on a horizontal axis and rotatable with respect to the frame, means for attaching the frame with respect to a supporting carriage or towing vehicle which allows contact to occur between the cutting blade and a ground surface below, said cutting blade having a peripheral ground entry part which is arranged to penetrate and cut a vertical slot in the ground surface as the apparatus travels over same, chute means carried by the frame, said chute means being arranged to disperse seed and fertilizer into a vertical slot cut by the cutting blade, said frame supporting at least one tine having a tip part for location below ground level and extending rearwardly of leading cutting edges of said cutting blade, the said at least one tine being adapted to cut a substantially horizontal branch slot below ground level which extends from the vertical slot cut by the cutting blade, and being mounted with respect to the frame below the axis of rotation of the cutting blade, the mounting allowing for lateral deflection of the tine in sympathy with flexing of the cutting blade, said apparatus further including a scraper arm supported from said frame and extending in close contact with at least the ground entry part of the cutting blade, said scraper presenting a downwardly sloping leading edge which removes matter from the ground entry part of the cutter blade as it rotates, wherein said scraper arm has a leading face which diverts emerging seed sideways into the branch slot cut by the said at least one tine.

2. Seed sowing apparatus as claimed in claim 1 wherein the chute means includes a channel formed between the frame, said at least one tine and the cutter blade, the channel directing matter passing through it in a rearward direction congruent with the direction of rotation of the cutting blade.

3. Seed sowing apparatus as claimed in claim 1 wherein a lower part of the channel is embodied in the said at least one tine and is inclined to facilitate frictional contact between the cutting blade and seed feed into the channel prior to dispersal from the channel.

4. Seed sowing apparatus as claimed in claim 1 having a pair of tines situated on opposite sides of the cutting blade so that the combination of the cutting blade and tines is able to cut a substantially tee-shaped slot in the ground surface below the apparatus.

5. Seed sowing apparatus as claimed in claim 1 including a press wheel supported by said frame and trailing the cutting blade, said press wheel being adapted to close the vertical slot by the cutting blade.

* * * * *